United States Patent [19]

Weppler

[11] Patent Number: 4,630,233
[45] Date of Patent: Dec. 16, 1986

[54] I/O SCANNER FOR AN INDUSTRIAL CONTROL

[75] Inventor: Robert C. Weppler, Warrensville Heights, Ohio

[73] Assignee: Allen-Bradley Company, Inc., Milwaukee, Wis.

[21] Appl. No.: 624,383

[22] Filed: Jun. 25, 1984

[51] Int. Cl.⁴ .............................................. G06F 15/46
[52] U.S. Cl. .................................................... 364/900
[58] Field of Search ........ 364/136, 137, 200 MS File, 364/900 MS File

[56] References Cited

U.S. PATENT DOCUMENTS

| | | |
|---|---|---|
| 3,982,230 | 9/1976 | Burkett et al. ...................... 364/900 |
| 4,038,533 | 7/1977 | Dummermuth et al. ........ 364/900 X |
| 4,151,589 | 4/1979 | Ross ..................................... 364/137 |
| 4,254,473 | 3/1981 | Galdun et al. ....................... 364/900 |
| 4,354,226 | 10/1982 | Flickinger et al. ............. 364/900 X |
| 4,404,651 | 9/1983 | Grudowski .......................... 364/900 |
| 4,477,882 | 10/1984 | Schumacher et al. ............... 364/900 |

Primary Examiner—Thomas M. Heckler
Attorney, Agent, or Firm—Quarles & Brady

[57] ABSTRACT

The I/O modules for an industrial control processor are connected together in a serial I/O ring. The processor performs an I/O scan sequence in which output data for the I/O modules is shifted serially from an output image table onto the I/O ring and input data from the I/O modules is pushed around the I/O ring and into the processor where it updates an input image table.

7 Claims, 11 Drawing Figures

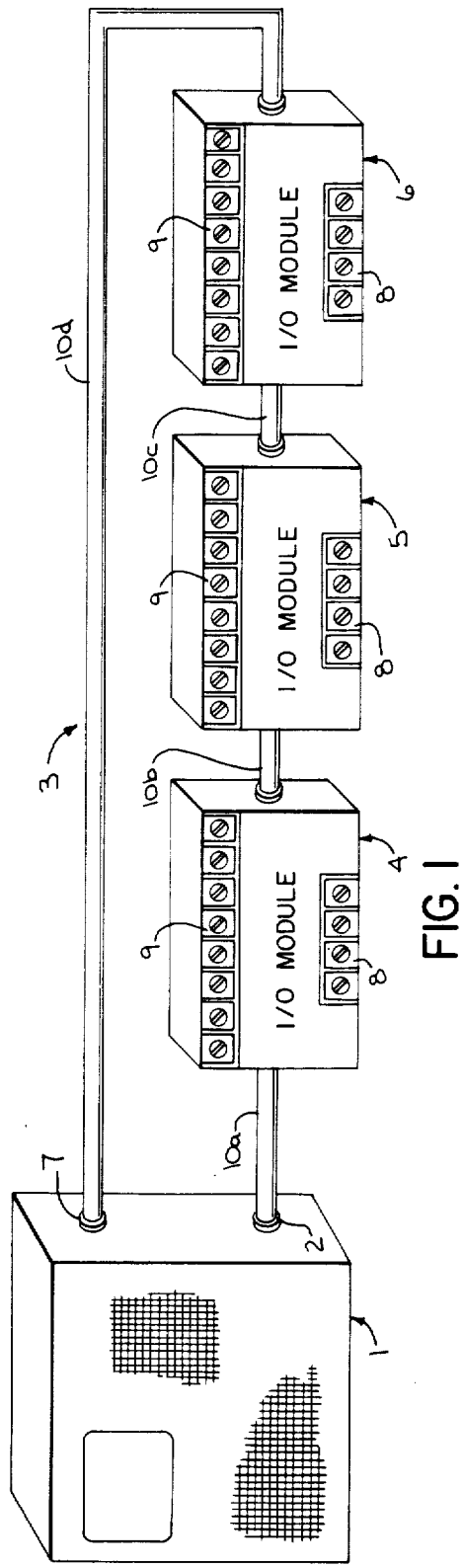
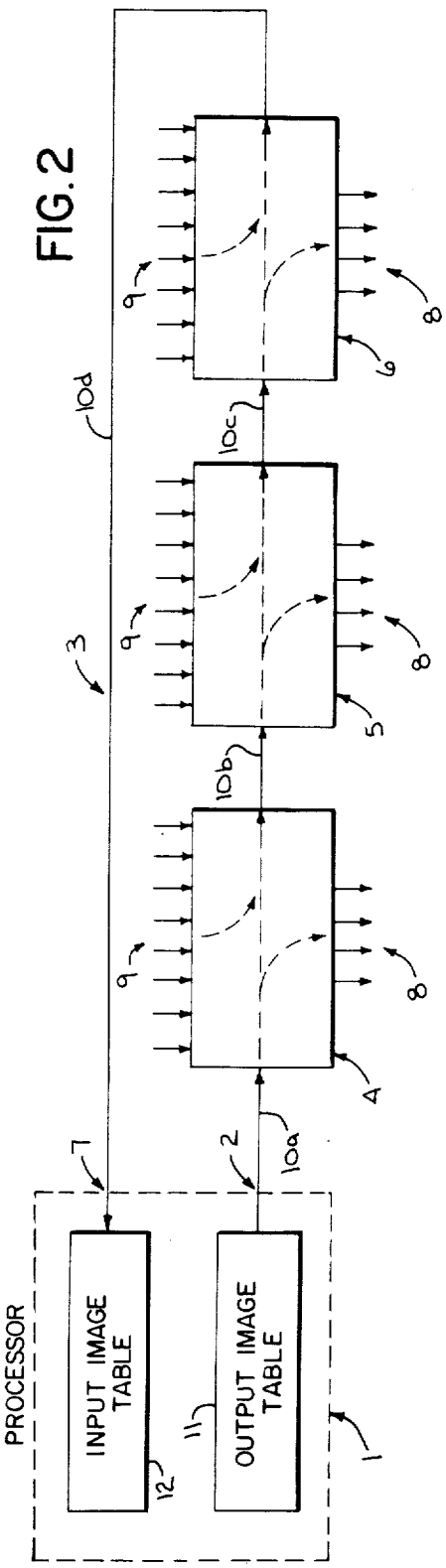

I/O SCAN PROGRAM

I/O SCANNER FOR AN INDUSTRIAL CONTROL

BACKGROUND OF THE INVENTION

The field of the invention is industrial control systems, such as numerical controls, programmable controllers and process controls which are connected to numerous sensing devices and operating devices in the factory environment.

In numerical controls such as those disclosed in U.S. Pat. Nos. 4,038,533 and 4,228,495 and in programmable controllers such as those disclosed in U.S. Pat. Nos. 4,266,281 and 3,982,230, a processor operates to input data from sensors, perform calculations and output data to operating devices. While some input/output (I/O) data may be directly operated upon by the processor, it is common practice to operate on I/O data contained in an I/O image table which is created in the processor's memory. In such systems an I/O scan is periodically performed to update the state of the input image table with the current status of the sensing devices connected to the machine, and to write the output image table to corresponding operating devices connected to the machine.

There are numerous methods presently used to perform the periodic I/O scan. In U.S. Pat. No. 4,038,533 the numerical control processor is periodically interrupted from its other functions to perform the I/O scan itself. In U.S. Pat. No. 4,228,495 a separate "programmable interface" processor which couples to the main processor performs a number of I/O functions, including the periodic I/O scan. And finally, in U.S. Pat. No. 3,942,158 a separate input/output "scanner" circuit is provided to perform the I/O scan on a continuous basis by periodically "stealing" access time to the I/O image table from the main processor.

There are also a variety of architectures used for the I/O interface circuitry. The most common structures employ a set of I/O modules which are mounted in an I/O rack such as those disclosed in U.S. Pat. Nos. 3,992,654; 4,151,580 and 4,152,750. The I/O rack may also house the processor as in U.S. Pat. Nos. 4,293,924 and 4,263,647, or the I/O rack may be physically separate from the processor as in U.S. Pat. Nos. 3,997,879, 3,982,230 and 4,250,563. When the I/O modules are loated in the same rack with the processor, they usually share a common backplane bus structure in which I/O data is conveyed in parallel. On the other hand, when the I/O racks are physically separate from the processor, the usual practice is to convey I/O data serially to reduce the cost of the electrical interconnection. Such serial communications usually involve a complex protocol that reduces the efficiency of the I/O data link and increases the cost.

SUMMARY OF THE INVENTION

The present invention is an I/O structure for an industrial processor which provides efficient, cost-effective coupling of I/O data between a processor and separate I/O modules. More specifically, the invention includes one or more I/O modules connected in a serial I/O ring with a processor, each I/O module including a serial input port for receiving serial data on the ring, a serial output port for transmitting data on the ring, input means for receiving input data from sensing devices connected to the I/O module, output means for applying output data to operating devices connected to the I/O module, and control means for coupling data received at the serial input port to the serial output port. The processor outputs data to the serial I/O ring, and each I/O module places its input data on the I/O ring. As output data is advanced around the I/O ring from module to module, input data is advanced around the I/O ring until it is received at the processor.

A general object of the invention is to provide an efficient I/O data transfer system for an industrial processor. The elements of the I/O ring are linked together by a serial data link, and this substantially reduces the cost of linking I/O modules which are physically separated. The communications protocol is simplified considerably by using the ring configuration and an I/O scan sequence which does not require address data.

Another object of the invention is to provide a serial I/O system in which the I/O scan may be executed quickly. This is accomplished in part by the minimal protocol overhead, and in part by the use of a ring configuration. As output data is placed on the serial I/O ring through a serial output port on the processor, input data is received substantially concurrently from the serial I/O ring. This concurrent I/O scan is much quicker than prior techniques in which a separate output scan and then an input scan of the I/O data are performed.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a pictorial view of a processor connected to a series of I/O modules according to the present invention;

FIG. 2 is a schematic diagram showing the flow of I/O data in the system of FIG. 1;

DESCRIPTION OF THE PREFERRED EMBODIMENT

Figure 3:
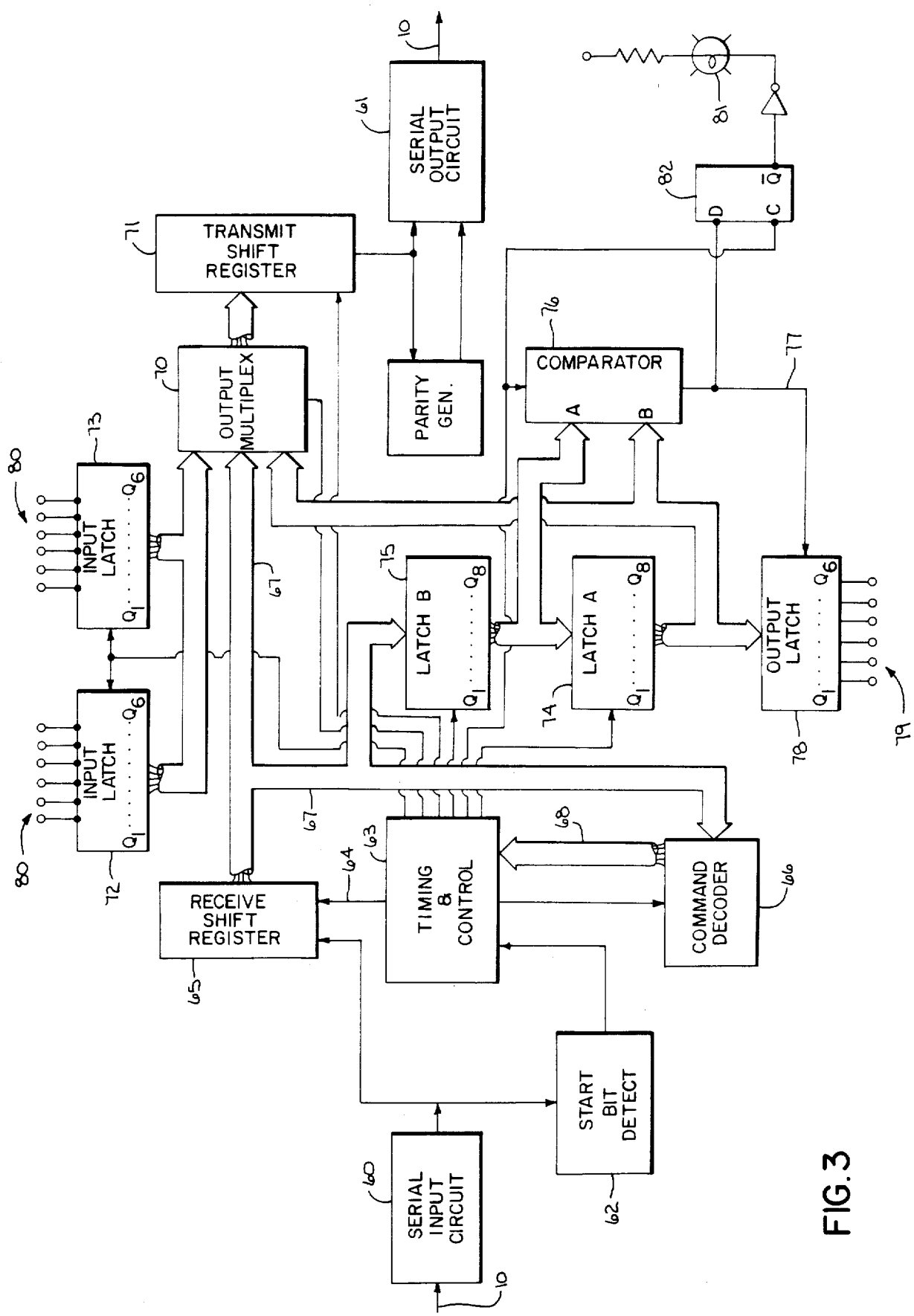
FIG. 3 is an electrical schematic diagram of the communications controller circuit which forms part of the processor and I/O modules of FIG. 1.

Referring particularly to FIGS. 1 and 2, a processor 1 has a serial output port 2 which connects to a communications ring indicated generally at 3. The communications ring is comprised of three I/O modules 4, 5 and 6 which connect in series to the processor's serial output port 2 and which connect to a serial input port 7 on the processor 1. As will be explained in detail below, data is output serially through the output port 2, shifted through the I/O modules 4, 5 and 6, and into the serial input port 7.

Each I/O module 4, 5 and 6 includes a set of output terminals 8 which may be connected to operating devices such as lamps, motor drives, solenoids and alarms. Each I/O module 4, 5 and 6 also includes a set of input terminals 9 which may be connected to sensing devices such as manual switches, pressure sensors, light sensors, proximity switches, and limit switches. The communication link 10 which connects the elements of the ring 3 together may be a twisted wire pair, coaxial cable, optical fiber or other serial communication link media which is suitable for use in an industrial environment. The drivers and receivers at the ends of each link segment 10 are chosen to match the selected communications media. The lengths of each link segment 10 will vary depending on the particular application. For example, the I/O modules 4, 5 and 6 may be located in a separate cabinet from the processor 1, and in such case, the links 10a and 10d are relatively long and the links 10b and 10c are very short. It will become apparent from the description below that the present invention does not limit the number of I/O modules which may be employed in the ring 3, the number of I/O points which may reside at each module, or the choice of communications media which may be used in the ring 3.

Referring particularly to FIG. 2, the communications ring 3 is operated when the processor 1 performs an I/O scan to output data from its output image table 11 and to input data to its input image table 12. The I/O scan is performed by sequentially shifting the contents of the output image table 11 on to the ring 3. Concurrently, input data from each I/O module 4, 5 and 6 is inserted on the ring 3 and shifted into the input image table 12. Thus, when all of the output data has been shifted from the output image table 18, the input image table 12 has also been updated by input data returned through serial input port 7.

Figure 5A:
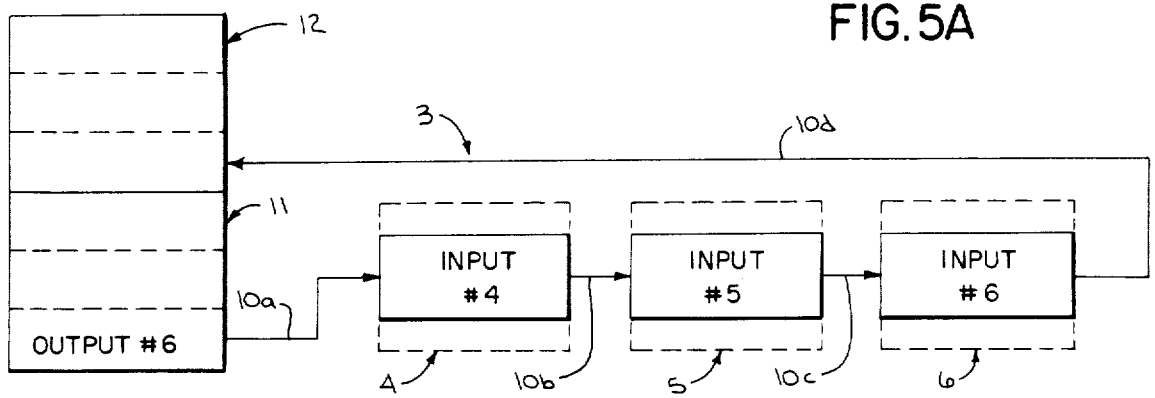
FIGS. 5A-5D are schematic diagrams used to illustrate data flow in the system of FIG. 1.
Figure 5B:
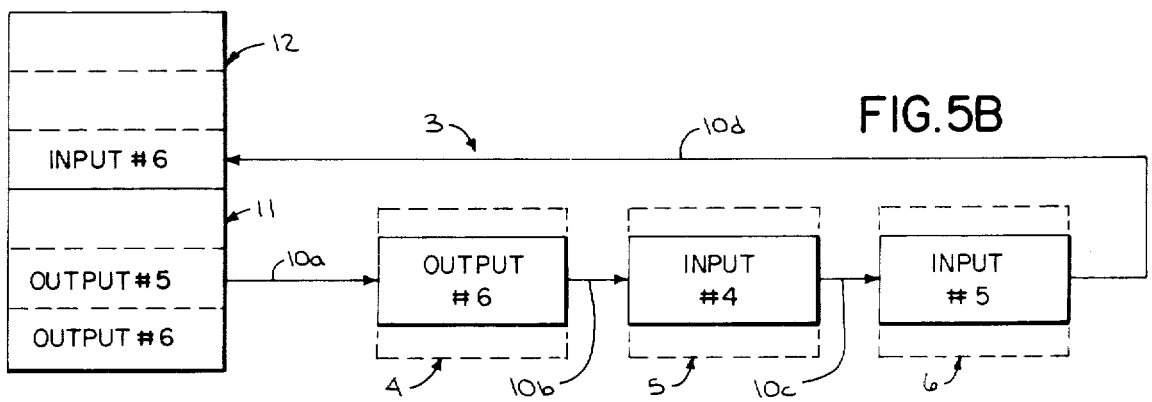

The essence of this I/O scan is illustrated in FIGS. 5A-5D. As shown in FIG. 5A, the first step in the I/O scan is for the processor 1 to set pointers to the last entries in both image tables 11 and 12. The output data for I/O module 6 is transmitted to I/O module 4 and the I/O scan advances to the state shown in FIG. 5B. The input data applied to module 4 is latched when it receives this output data.

The input data which was previously latched by I/O module 4 is shifted forward around the I/O ring 3, with the input data for the last I/O module 6 being deposited in the last entry of the input image table 12. The pointer for the output image table 11 is then advanced to the entry for I/O module 5, and the output data for I/O module 5 is output from the table 11 by the processor 1.

Figure 5C:
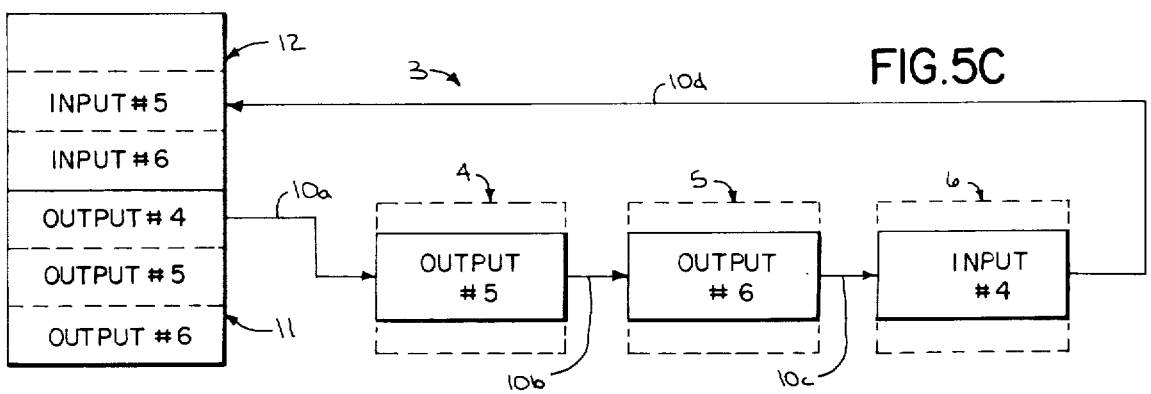
Figure 5D:
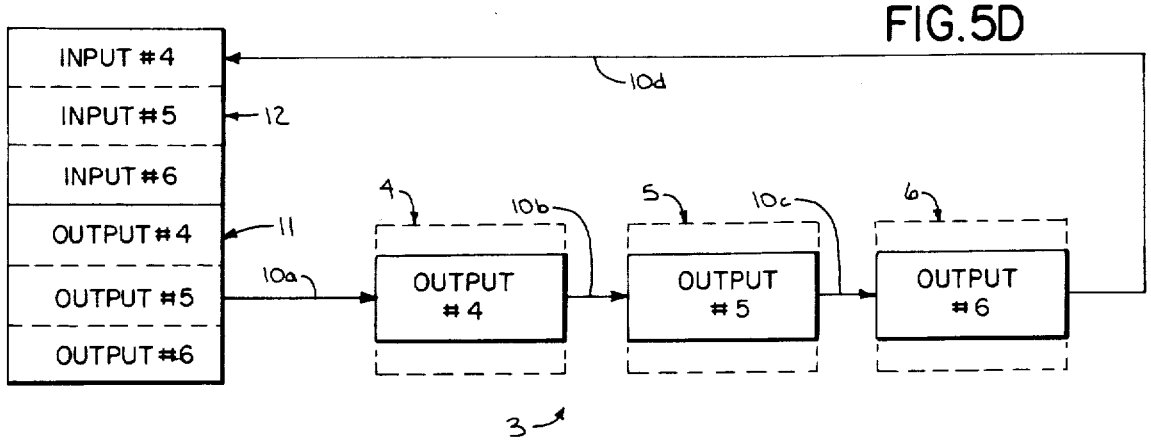

As shown in FIG. 5C, the I/O scan then advances to the next step in which the image table pointers are advanced to the next table entries and the data on the I/O ring 3 is shifted ahead. The input data for I/O module 5 is received by the processor 1 and this is written into the input image table 12. The last of the output data for I/O module 4 is then transmitted on the I/O ring 3 and the I/O scan advances to the state shown in FIG. 5D. Again, the data is shifted forward around the I/O ring 3 and the input data for I/O module 4 is received by the processor 1 and is written into the input image table 12. The processor 1 then transmits a "CHECK COMMAND" on the I/O ring 3 which is passed around the ring 3 by each I/O module 4–6. As each I/O module 4–6 receives this command, it checks the integrity of the output data which it received during the scan. The CHECK COMMAND carries an error indication back to the processor 1 if a problem is detected. The processor 1 then transmits an "UPDATE COMMAND" on the I/O ring 3. As each I/O module 4–6 receives this command, it again checks the integrity of the output data which it received during the scan. If this data is good, the data is latched and output to the I/O module's terminals 8. Receipt of the UPDATE COMMAND back from the I/O ring 3 signals the processor 1 that the I/O scan is complete and that another I/O scan can be started.

Figure 4:
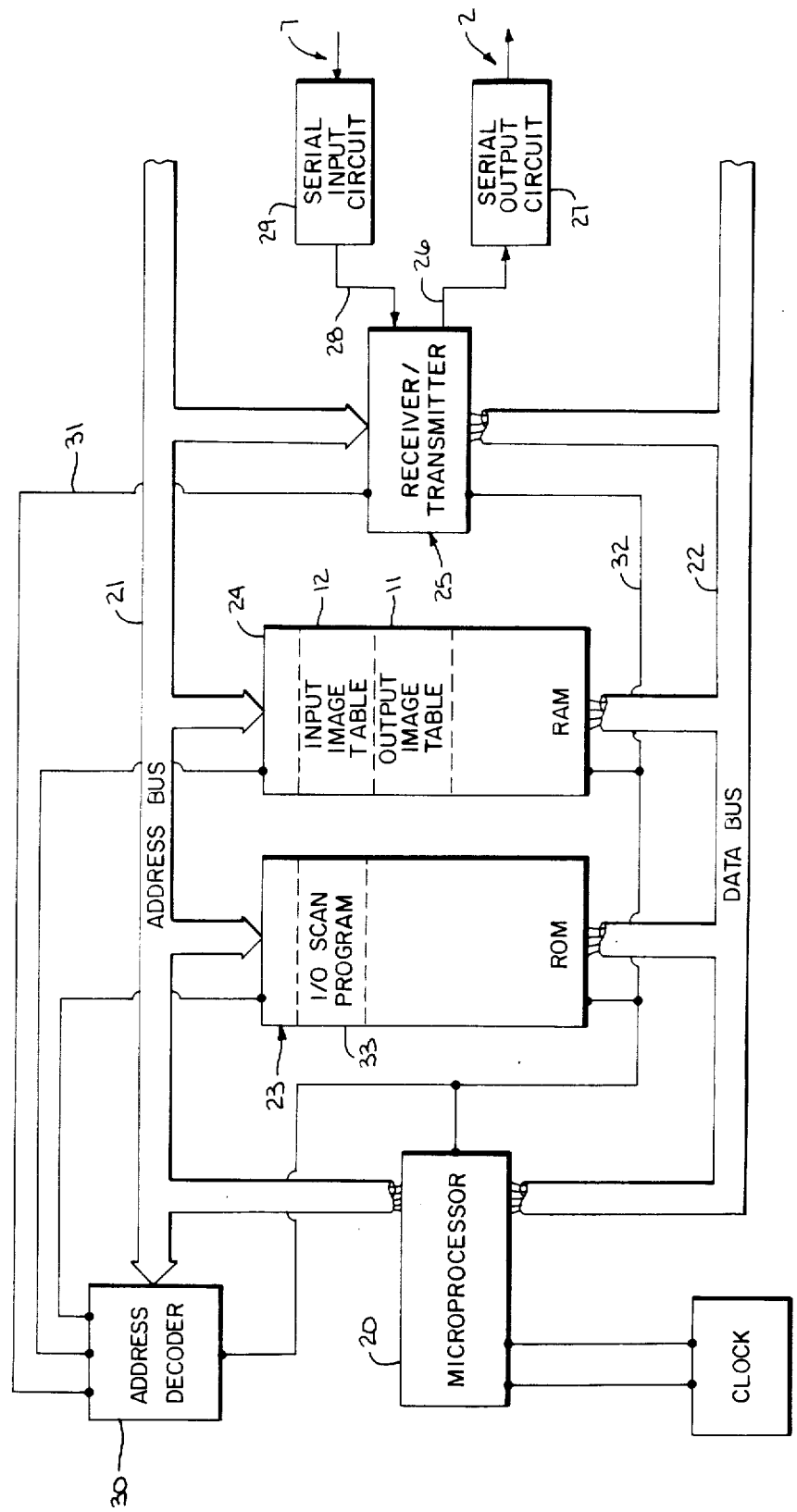
FIG. 4 is an electrical schematic diagram of the processor of FIG. 1.

Referring particularly to FIG. 4, the processor 1 is a microprocessor-based system which is structured about an 8-bit microprocessor 20 that drives an address bus 21 and a data bus 22. The microprocessor 20 operates in response to machine language program instructions which are read from a read-only memory (ROM) 23, and it operates on data which is stored in a random access memory (RAM) 24. In the preferred embodiment described herein the microprocessor 20 performs the programmable interface functions on a numerical control system such as that described in U.S. Pat. No. 4,228,495.

The I/O loop 3 is operated by the microprocessor 20 through a receiver/transmitter 25. The receiver/transmitter 25 has a serial output line 26 which drives the processor output port 2 through an appropriate serial output circuit 27. Similarly, the processor input port 7 is coupled to a serial input line 28 by a serial input circuit 29. The particular circuits chosen to connect with the I/O loop 3 will, of course, depend on the communications media which is chosen.

The receiver/transmitter 25 as well as the other elements in the processor 1 may be enabled when addressed by the microprocessor 20. The addresses which appear on the bus 21 are applied to an address decoder 30 that provides a chip enable signal to the system element being addressed. The receiver/transmitter 25 is thus enabled through control line 31, and data may be written to it or read from it through the data bus 22. A read/write control line 32 which is driven by the microprocessor 20 determines whether a read or a write operation is performed, and an address code from the address bus 21 selects the source or destination of data within the receiver/transmitter 25. For example, a status byte may be read from the receiver/transmitter 25 which indicates if a character has been received through input port 7 and if the transmit buffer is available to accept a character for transmission through serial output port 2. In addition, a character received from the I/O ring 3 may be read from the receiver/transmitter 25, and a character may be written to its transmit buffer for transmission on the I/O ring 3.

The input image table 12 and the output image table 11 are stored in the RAM 24 along with other data structures (not shown) required to carry out the programmable interface functions. In addition, an I/O scan program indicated at 33 is stored in the ROM 23. As will now be described in detail, the microprocessor 20 periodically executes the I/O scan program 33 to couple the data in the I/O image tables 11 and 12 with the sensing devices and operating devices connected to the I/O ring 3.

Figure 6:
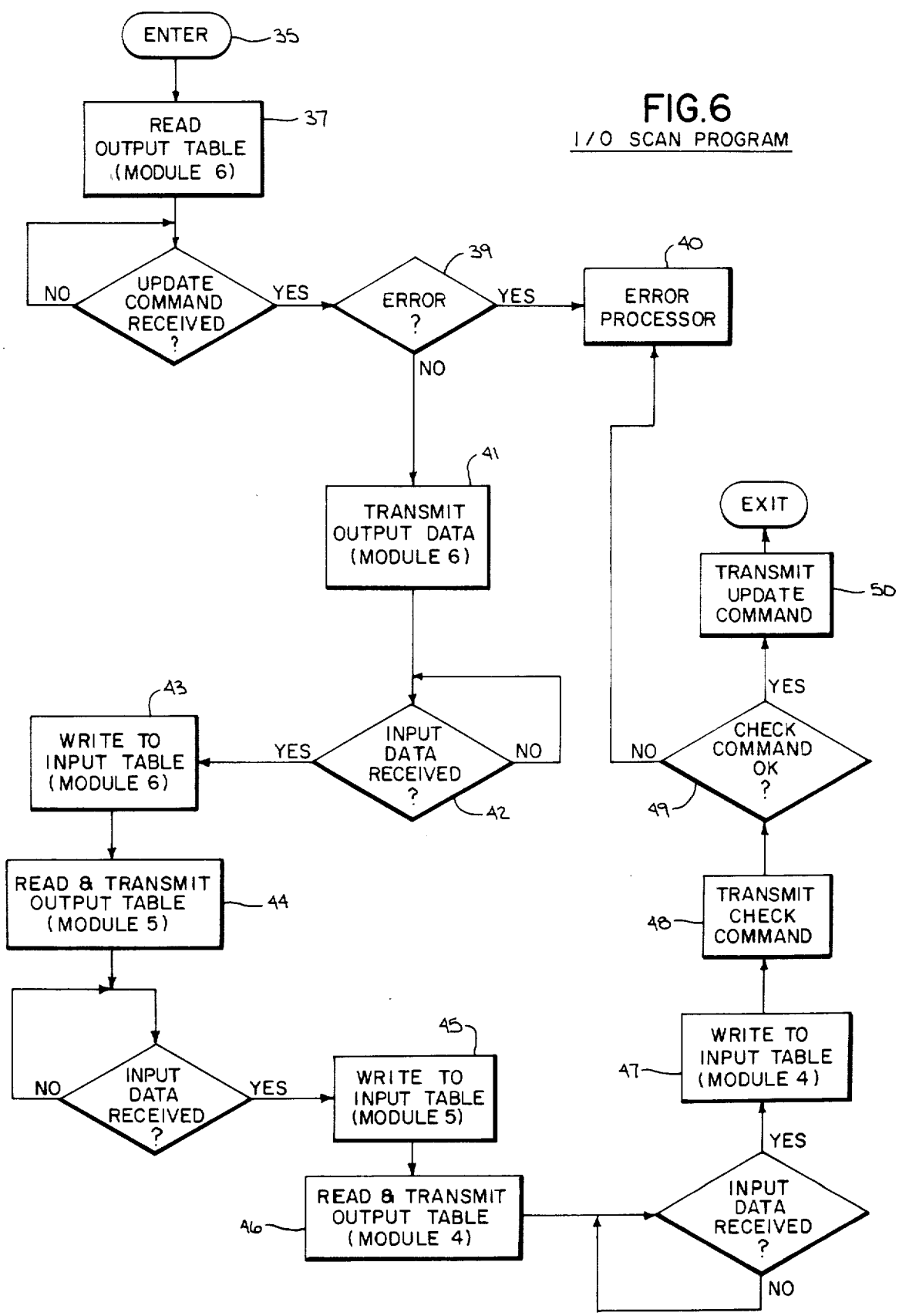
FIG. 6 is a flow chart of the I/O scan program which is executed by the processor of FIG. 1.
Figure 7A:
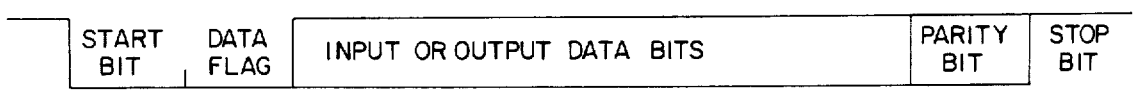
FIGS. 7A and 7B are schematic diagrams of data packets and command packets which are employed in the system of FIG. 1.

Referring particularly to FIG. 6, the I/O scan program is entered at 35 each time the I/O image tables 11 and 12 are to be updated. The outputs for I/O module 6 are then read from the output image table 11, as indicated by process block 37, and two OUTPUT packets in the format shown in FIG. 7A are formed. When the UPDATE COMMAND has traversed the I/O ring 3 and is received back at the receiver/transmitter 25, an "OK" flag in the UPDATE COMMAND is checked at decision block 39. If a problem exists on the I/O ring 3, this flag is set and the system branches to process the error at process block 40.

If the I/O ring 3 is operating properly, the output data for I/O module 6 is output, as indicated at process block 41, and a loop is entered at decision block 42 to await receipt of input data. The input data is received in the form of two INPUT packets in the format shown in FIG. 7A. This input data is written to the input image table 12 at the locations for I/O module 6, as indicated at process block 43. The output data for I/O module 5 is then read from the output image table 11 and transmitted on the I/O ring 3, as indicated at process block 44.

Figure 7B:
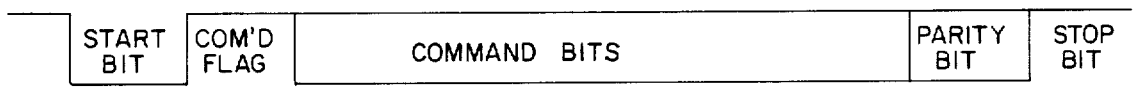

The process repeats, with the input data for I/O module 5 being received at process block 45 and the output data for I/O module 4 being transmitted at process block 46. When the input data from I/O module 4 is received and written to the input image table 12 at process block 47, the CHECK COMMAND is formed and transmitted at process block 48. The format of this command is shown in FIG. 7B, and when it has traversed the I/O ring 3 and is received back at the receiver/transmitter 25, the "OK" bit therein is checked at decision block 49. If an error is indicated, the system branches to the error processor 40. Otherwise, the processor 1 executes a set of instructions indicated by process block 50 to both form and transmit the UPDATE COMMAND on the I/O ring 3. The format of this command is shown in FIG. 7B. The I/O scan program is then exited.

While the I/O modules 4, 5 and 6 can be constructed using a variety of commercially available integrated circuits, in the preferred embodiment, a "state machine" is constructed using a custom integrated circuit. The circuit diagram for each I/O module 4–6 is shown in FIG. 3, where the serial input circuit 60 and the serial output circuit 61 are chosen to match the particular serial communication link 10 chosen. For example, if a fiber optic link 10 is used, the serial input circuit 60 may take the form of an optical receiver such as the model HFBR-2502 from Hewlett Packard Company, and the serial output circuit 61 may take the form of an optical transmitter such as the model HFBR-1502 from Hewlett Packard Company.

The data received and transmitted on the serial link 10 is comprised of 10-bit packets. Referring particularly to FIGS. 7A and 7B, the first bit in each packet is a "start" bit and the last bit is a "stop" bit. The second bit in each packet indicates whether the packet contains data or command information. As shown in FIG. 7A, data packets contain six data bits and a parity bit, whereas command packets contain six command bits and a parity bit as shown in FIG. 7B.

Referring particularly to FIG. 3, when a packet is received at the serial input circuit 60 of an I/O module, a start bit detect circuit 62 is enabled and a timing and control circuit 63 produces a clock signal through line 64 for a receive shift register 65. The remaining bits in the packet are received and shifted into the register 65 by the clock signal. The timing and control circuit 63 then enables a command decoder 66 if the packet is a command packet, and the command data is coupled to the decoder 66 from the register 65 through a bus 67. As will be described in more detail below, command packets indicate a number of different functions that are to be carried out, and the particular function is signaled to the timing and control circuit 63 through a bus 68.

The command data is also coupled through the bus 67 to an output multiplexor 70 where it is applied to the inputs of a transmit shift register 71. In response to clock pulses received from the timing and control circuit 63, the command packet is shifted out of the register 71 to the serial output circuit 61. In this manner, command packets received at the serial input circuit 60 are coupled to the serial output circuit 61 for transmission around the I/O ring 3.

Referring still to FIG. 3, when a data packet is received and shifted into the register 65, the operation of the I/O module circuitry is different. First, the contents of one of the input latches 72 or 73 or the contents of an A latch 74 is applied through the output multiplexor 70 to the transmit shift register 71. Thus, as the data packet is received, another data packet is being transmitted through the serial output circuit 61. When the data packet is totally received and its parity checked, the contents of B latch 75 is applied to the A latch 74, and the new data packet is stored in the B latch 75.

The latches 74 and 75 provide a buffer for two data packets. As the data packets for other I/O modules on the I/O ring 3 are received, they are coupled through the B latch 75, then the A latch 74 and then transmitted through the serial output circuit 61.

Similarly, output data for the I/O module is received as two successive data packets. These two output data packets are pushed into the latches 74 and 75. The output bits in the B latch 75 are the complement of the output bits in the A latch 74. At this moment in the I/O scan sequence, the UPDATE COMMAND packet is received at the serial input circuit 60 and decoded by the command decoder 66. In response, the timing and control circuit 63 enables a comparator 76 which produces an enabling signal on line 77 if the output data in the B latch 75 is the exact complement of the output data in the A latch 74. This enabling signal applies the data in A latch 74 to an output latch 78 which drives six output circuits through leads 79. Output circuits such as that disclosed in U.S. Pat. No. 3,745,546 may be used for this purpose.

Input data is received at the input latches 72 and 73 through lines 80. These lines 80 are driven by input circuits such as those disclosed in U.S. Pat. Nos. 3,643,115 and 4,275,307 which connect to the I/O module's input terminals 9.

The I/O module of FIG. 3 operates as follows during the I/O scan sequence. When a data packet is received at the shift register 65, the input latches 72 and 73 are clocked and the contents of input latch 72 is applied to the transmit shift register 71 for transmission around the I/O ring 3. The received data packet is applied to the B latch 75. When the next data packet is received, the contents of input latch 73 is transmitted on the I/O ring 3 and the received data packet is stored in the B latch 75 after pushing its contents to the A latch 74. As subsequent data packets are received, the contents of the A latch 74 is applied to the transmit shift register 71 and the received data packet is stored in the B latch 75, pushing its contents to the A latch 74.

Data packets are passed through the I/O module until an UPDATE COMMAND is received at the shift register 65. When this occurs, the data stored in the A latch 74 and B latch 75 is compared by the comparator circuit 76. If this data is complementary, the contents of the A latch 74 is applied to the output latch 78 and the UPDATE COMMAND is forwarded to the next I/O module on the ring through the transmit shift register 71. If an error has occurred so that the output data is not complementary, the output data is not applied to the output latch 78. Instead, the "OK" bit is cleared in the UPDATE COMMAND to indicate an error before it is sent on to the next I/O module on the I/O ring 3. Also, a fault light 81 is energized through a D-type flip-flop 82. As indicated above, when the UPDATE COMMAND is received back at the processor 1, the OK bit is checked and appropriate action taken if it is cleared.

As indicated previously, the CHECK COMMAND is sent around the I/O ring 3 just prior to the UPDATE COMMAND. A similar comparison of the output data and its complement is made by each I/O module 4-6 when this command is received. The "OK" bit in the CHECK COMMAND is cleared if a problem is found in any of the I/O modules 4-6, and the processor 1 may respond to such an error by not transmitting the UPDATE COMMAND. Thus, if faulty output data is detected, none of the outputs are updated.

What is claimed is:

1. An input/output system for an industrial control system which comprises:
    a control processor having memory means for storing an input image table and an output image table, and having a serial output port for transmitting data from the output image table to a first serial data link and having a serial input port for receiving input data from a second serial data link and storing it in the input image table; and
    a plurality of I/O modules, each having a serial input port and a serial output port, the I/O modules being connected in series, and the input port of the first I/O module being connected to the first serial data link and the serial output port of the last I/O module being connected to the second serial data link to form a serial I/O ring, and wherein each I/O module includes:
    (a) an output latch for applying output data received at the I/O module's serial input port to a set of output terminals;
    (b) an input latch for applying input data received at a set of I/O module input terminals to the I/O module's serial output port; and
    (c) control means for directing input data from the input latch to the I/O module's serial output port, directing output data received at the I/O module's serial input port to the I/O module's serial output port, and directing output data received at the I/O module's serial input port to the output latch.

2. The input/output system as recited in claim 1 in which the control processor includes means for performing an I/O scan sequence which includes sequentially transmitting the contents of the output image table through the serial output port to the first serial data link and sequentially receiving input data for the input image table from the second serial data link through the serial input port, and transmitting a command through the serial output port to the first serial data link.

3. The input/output system as recited in claim 2 in which the control means in each I/O module is responsive to the receipt of the command to synchronize an I/O module sequence in which the command is directed to the I/O module's serial output port for transmission around the I/O ring, the I/O module's input data is directed from the input latch to the I/O module's serial output port as data is subsequently received at its serial input port, and such subsequently received data is directed to the I/O module's serial output port until the I/O module's output data is received and is directed to the I/O module's output latch.

4. The input/output system as recited in claim 3 in which the control processor transmits an update command through its serial output port to the first serial data link, and each I/O module is responsive to the receipt of such update command to latch the output data which has been received by the I/O module and apply the output data to the I/O module's output terminals, and to direct the update command to its serial output port for transmission around the I/O ring.

5. The input/output system as recited in claim 4 in which each module's output data includes redundant output data and each I/O module includes comparator means for checking the integrity of its output data by comparing it with the redundant output data.

6. The input/output system as recited in claim 5 in which each module includes means coupled to the comparator means for altering the update command when an error is detected in the output data, and the control processor includes means for receiving the update command after it has been transmitted around the I/O ring and indicating an error if the update command has been altered.

7. The input/output system as recited in claim 5 in which each module includes means coupled to the comparator means for providing a visual indication if errors are detected in the output data.

* * * * *